United States Patent
Jones

(10) Patent No.: US 11,523,621 B2
(45) Date of Patent: Dec. 13, 2022

(54) PARTICULATE FROZEN CREAM

(71) Applicant: DIPPIN' DOTS, L.L.C., Paducah, KY (US)

(72) Inventor: Stan Jones, Vienna, IL (US)

(73) Assignee: DIPPIN' DOTS, L.L.C.

(*) Notice: Subject to any disclaimer, the term of this patent is extended or adjusted under 35 U.S.C. 154(b) by 191 days.

(21) Appl. No.: 16/642,583

(22) PCT Filed: Sep. 6, 2018

(86) PCT No.: PCT/US2018/049710
§ 371 (c)(1),
(2) Date: Feb. 27, 2020

(87) PCT Pub. No.: WO2019/051058
PCT Pub. Date: Mar. 14, 2019

(65) Prior Publication Data
US 2020/0345026 A1   Nov. 5, 2020

Related U.S. Application Data

(60) Provisional application No. 62/556,124, filed on Sep. 8, 2017.

(51) Int. Cl.
| A23C 13/08 | (2006.01) |
| A23C 13/12 | (2006.01) |
| A23C 13/14 | (2006.01) |
| A23L 3/44 | (2006.01) |

(52) U.S. Cl.
CPC .......... *A23C 13/085* (2013.01); *A23C 13/125* (2013.01); *A23C 13/14* (2013.01); *A23L 3/44* (2013.01); *A23V 2002/00* (2013.01)

(58) Field of Classification Search
CPC ..... A23C 13/085; A23C 13/125; A23C 13/14; A23L 3/44; A23V 2002/00
USPC ........................................................ 426/586
See application file for complete search history.

(56) References Cited

U.S. PATENT DOCUMENTS

| | | | |
|---|---|---|---|
| 6,000,229 A | 12/1999 | Jones et al. | |
| 6,223,542 B1 | 5/2001 | Jones et al. | |
| 6,308,522 B1 | 10/2001 | Jones et al. | |
| 6,401,464 B2 | 6/2002 | Jones et al. | |
| 6,481,226 B2 | 11/2002 | Jones et al. | |
| 6,494,049 B1 | 12/2002 | Jones et al. | |
| 6,555,154 B2 | 4/2003 | Jones et al. | |
| 6,560,973 B2 | 5/2003 | Jones et al. | |
| 6,915,896 B2 | 7/2005 | Jones | |
| 7,147,884 B2 | 12/2006 | Jones et al. | |
| 7,316,122 B1 | 1/2008 | Jones et al. | |
| 7,318,324 B2 | 1/2008 | Ulrich et al. | |
| 7,464,564 B2 | 12/2008 | Whiteside et al. | |
| 8,272,226 B2 | 9/2012 | Jones | |
| 2001/0007690 A1 | 7/2001 | Girsh | |
| 2006/0105083 A1* | 5/2006 | Brooker | A23G 9/52 426/101 |
| 2007/0166447 A1 | 7/2007 | Ur-Rehman et al. | |
| 2007/0254064 A1 | 11/2007 | Smith et al. | |
| 2008/0138486 A1 | 6/2008 | Jones | |
| 2008/0138487 A1* | 6/2008 | Jones | A23G 9/44 426/583 |
| 2009/0047393 A1 | 2/2009 | Jones | |
| 2012/0183667 A1 | 7/2012 | Jones et al. | |
| 2012/0196006 A1 | 8/2012 | Jones | |
| 2014/0099422 A1 | 4/2014 | Panyam et al. | |
| 2015/0351438 A1 | 12/2015 | Yang | |
| 2017/0202232 A1 | 7/2017 | Kontkanen et al. | |

FOREIGN PATENT DOCUMENTS

| | | | |
|---|---|---|---|
| CN | 101849627 | 10/2010 | |
| CN | 106259895 | 1/2017 | |
| WO | 2013002783 | 1/2013 | |
| WO | WO-2013002783 A1 * | 1/2013 | ............... A23G 9/48 |

OTHER PUBLICATIONS

Anhydrous Milk Fat, Aug. 29, 2016, Google Website Search, pp. 1-4.
PCT International Search Report mailed in corresponding PCT Application No. PCT/US2018/049710 dated Nov. 28, 2018, pp. 1-8.
Chinese Office Action mailed in corresponding Chinese Application No. 201880056593X dated Jun. 1, 2021, pp. 1-6.

* cited by examiner

*Primary Examiner* — Brent T O'Hern
(74) *Attorney, Agent, or Firm* — The Belles Group, P.C.

(57) ABSTRACT

A particulate frozen dairy product comprising beads which remain free-flowing when at a temperature of about −12° C. or less. The beads comprise of a dairy product selected from the group consisting of frozen neat cream and frozen anhydrous milk fat. Included is a method of shipping a frozen dairy product. The method comprises cryogenically freezing a neat cream to form a plurality of frozen beads, and shipping the frozen beads while maintaining said frozen beads at a temperature less than −12° C. such that the frozen beads remain free-flowing during shipping. Further, the frozen beads are ideal for shipping, storage and use in that they lend themselves to multiple packaging options and easy proportioning for recipes.

7 Claims, No Drawings

PARTICULATE FROZEN CREAM

CROSS REFERENCE TO RELATED APPLICATION

This application claims the benefit of U.S. Provisional Patent Application No. 62/556,124 filed on Sep. 8, 2017.

FIELD

The present disclosure relates generally to the field of dairy cream, and more specifically, to the preparation of dairy cream for shipping and use, and to the use of dairy cream in food preparation.

BACKGROUND

Fresh cream is in large demand for the foodservice industry and for home use. However, fresh cream only has a refrigerated shelf life of about one to two weeks. This can make it difficult to keep adequate quantities of fresh cream on hand in the home, where cream is often wasted due to spoilage.

Additionally, in many countries, fresh cream is not available from a trusted, quality source, and the short shelf life of cream makes shipping it long distance impractical because of spoilage. To overcome this problem, the cream has been altered. For example, many countries throughout Asia import anhydrous milk fat in five (5) gallon pails, fifty-five (55) gallon drums, or one thousand (1000) kilogram totes to use as their source of cream for many kinds of food products and cooking applications. Using anhydrous milk fat as the source of cream is problematic because it typically comes in the large quantity drums or totes causing portioned usage and distribution to be difficult as well as increasing the possibility of spoliation as well as labor and/or distribution costs for those in the labor industry. Additionally, the quality and taste of food products prepared with anhydrous milk fat does not compare favorably with the quality and taste of food products made with fresh cream.

Accordingly, the food industry remains interested in ways to increase the shelf life of cream without sacrificing the quality and flavor of the food products made using the cream.

SUMMARY

Some embodiments of this disclosure are directed to a particulate frozen dairy product. The product comprises beads which remain free flowing when at a temperature of about −12° C. or less and optionally of −18° C. The beads are comprised of a dairy product selected from the group consisting of frozen neat cream and frozen anhydrous milk fat. The beads are essentially free of any non-dairy food ingredients other than thickeners or stabilizers.

The beads can have a diameter of from about 1 mm to about 15 mm, but optionally can have a diameter from about 1.5 mm to about 10 mm or from about 1 mm to about 5 mm.

In some of these embodiments, the beads consist essentially of neat cream. In others, the beads consist essentially of anhydrous milk fat.

Other embodiments are directed to a method of shipping a frozen dairy product. The method comprises:
 cryogenically freezing a neat cream to form a plurality of frozen beads, which are free-flowing at a temperature of −12° C. or less, optionally at a temperature of −18° C. or less, and have a diameter of from about 1 mm to about 15 mm; and
 shipping said frozen beads while maintaining said frozen beads at a temperature of −12° C. or less, optionally −18° C., such that the frozen beads remain free-flowing during shipping.

In some embodiments, the neat cream is essentially free of any non-dairy food ingredients other than thickeners or stabilizers. Also, the said frozen beads can consist essentially of neat cream.

In the embodiments, the diameter of the frozen beads can be from about 1.5 mm to about 10 mm, or from about 1 mm to about 5 mm. Additionally, the neat cream is frozen at a temperature of −184° C. (about −300° F.) or less.

In some of the above embodiments, the method further comprises the step of subjecting the frozen beads to a vacuum while maintaining said frozen beads at a temperature of less than −40° C. such that water is drawn from the frozen beads such that the frozen beads consist essentially of frozen anhydrous milk fat.

DETAILED DESCRIPTION

The present disclosure may be understood more readily by reference to the following detailed description as well as to the examples included therein. In addition, numerous specific details are set forth in order to provide a thorough understanding of the embodiments described herein. However, those of ordinary skill in the art will understand that the embodiments described herein can be practiced without these specific details. In other instances, methods, procedures and components have not been described in detail so as not to obscure the related relevant feature being described.

This disclosure concerns cream. Cream as used herein is dairy cream, a dairy product composed of the higher-butterfat (higher-milk fat) layer skimmed from the top of milk before homogenization. Broadly, dairy cream can have a fat content of about 10 wt-% to about 55 wt-%. However, higher-fat content creams cannot be readily poured; thus, as used herein, dairy cream more typically refers to dairy cream with a fat content of up to about 50 wt-%. More typically, the dairy cream can have a fat content of from about 18 wt-% to about 50 wt-%, from 20 wt-% to 50 wt-%, or from 20 wt-% to 42 wt-%.

More specifically, this disclosure concerns neat cream. As used herein "neat cream" refers to cream essentially free of admixture or dilution, except for thickening agents and stabilizers. More particularly, "neat cream" is essentially free of non-dairy-cream food ingredients, such as sugar, salt, eggs and other similar food ingredients, but can contain thickening agents or stabilizers in amounts to improve the thickness and whipping or retard separation of butterfat. "Essentially free" means that the food ingredients are not present in an amount sufficient to affect taste or performance of the cream, and more specifically, are present in amounts less than 0.1 wt-%, less than 0.05 wt-% or even less than 0.01 wt-%. As mentioned, thickening agents and stabilizers can be present in effective amounts. Generally, thickening agents are present in amounts from about 0 wt-% to about 2.0 wt-%. More typically, thickening agents and stabilizers are present in an amount from about 0.05 wt-% to about 1.0 wt-%, or from 0.1 wt-% to 0.5 wt-%. Often the thickening agent will also serve as a stabilizer. Suitable thickening agents and stabilizers include sodium alginate, carrageenan, gelatin, sodium bicarbonate, tetrasodium pyrophosphate, alginic acid, agar and pectin. Accordingly, "neat cream" as used herein can generally comprise at least 98.9 wt-% dairy cream, and more typically, at least 99.0 wt-%, or 99.5 wt-%, or even 99.9 wt-% dairy cream.

The cream of this disclosure is a particulate frozen cream comprising a neat cream in the form of beads. Generally, the beads remain in a solid frozen state at subzero temperatures, particularly at temperatures of about −12° C., and more typically −18° C. or less. Additionally, it presently is considered advantageous that the neat-cream beads of the current disclosure remain free flowing at temperatures that are greater than −30° C. Typically, the frozen neat-cream beads remain solid and free flowing at temperatures from below −40° C. to −12° C. It is especially advantageous that they are solid and free flowing at temperatures of −30° C. to about −12° C. The beads generally can have a diameter from about 1 mm to about 15 mm, and optionally, from about 1.5 mm to about 10 mm or from about 1 mm to about 5 mm. The free-flowing characteristics of the frozen neat-cream beads mean that the beads move in a continuous steady stream when poured from a container without clumping together or agglomeration of the beads into larger particles. Thus, the beads remain as individual beads during production, shipping, storage and use—as long as they are kept at the appropriate temperature described herein—and no large ice crystals are formed during production, shipping or storage. While not wishing to be bound by theory, it is presently believed that the free-flowing characteristic is at least partially contributed to the beads having a dry outer surface.

The free flowing characteristic of the frozen beads make them readily adaptable to machine type packing operations such as might be used on a production line in the packing of large quantities of beads. The free flowing characteristic makes the frozen beads pourable allowing for the rapid, efficient packing of containers by hand or machine. Additionally, the free-flowing characteristic allows for the use of a wide verity of packaging or container types and shapes, for example cartons (both boxes and pourable cartons such as cardboard milk-carton types), bags, jars and bottles. Also, the frozen beads are suitable for heat sealed plastic and to foils, tubs, tubes and similar packaging.

In some embodiments, the particulate frozen cream consists essentially of neat cream; that is, it is essentially free of non-dairy food ingredients—or more specifically, essentially free of non-dairy-cream food ingredients—other than thickeners or stabilizers. In other words, it does not include food ingredients other than dairy cream in an amount sufficient to affect the taste or performance of the particulate frozen cream. In other embodiments, the particulate frozen cream is essentially free of non-dairy-cream food ingredients including thickeners and stabilizers. In further embodiments, the particulate frozen cream consists of neat cream free from non-dairy-cream food ingredients other than thickeners or stabilizers. In still further embodiments, the particulate frozen cream consists of neat cream free from non-dairy-cream food ingredients, including thickeners or stabilizers.

The particulate frozen cream can be made by cryogenically freezing neat cream to form a plurality of neat-cream beads. Generally, the freezing is carried out at temperatures of about −184° C. (about −300° F.) or less. Typically, liquid nitrogen used to carry out the freezing; thus, the freezing is carried out at liquid nitrogen temperatures, generally, approximately −196° C. (about −320° F.) at food grade (99.998% purity). The neat cream can be cryogenically frozen into neat-cream beads by methods and apparatuses similar to those disclosed in U.S. Pat. No. 6,209,329 to Jones et al. and U.S. Pat. No. 6,539,743 to Jones, the disclosures of both of which are hereby incorporated by reference.

After producing the neat-cream beads, the beads can be shipped and/or stored by maintaining the cryogenically frozen beads at a temperature of −12° C. or less, or −18° C. or less, so as to keep them in a solid, free-flowing state. Because the neat-cream beads have a free-flowing state, they are easily conveyed by means of a screw conveyor, belt conveyor or other material handling system so that they can be easily repackaged or can be moved from one transportation or storage device to another. The small, frozen beads of neat cream can be packaged in many formats and volumes depending on the market where they will be consumed. For example, they can be packaged in bulk cases for food service applications or can be in small packages that can be sold to home consumers for preparing desserts and food creation at home.

Once shipped, they can be stored at the use site at a temperature of −12° C. or less, or −18° C. or less, until they are used. It is presently considered advantageous that the current frozen neat-cream beads can maintain a solid, free-flowing state at temperatures from −12° C. or less, and in particularly from −18° C. to greater than −30° C., and that they do not require temperatures of or below −30° C. to maintain a solid, free-flowing state.

Because the current neat-cream beads are frozen, they have a longer shelf life than refrigerated fresh cream. Generally, the shelf life of the neat-cream beads is from 2 months to 6 months, and more typically from 3 months to 5 months, at temperatures sufficient to keep the beads in a free-flowing state, about −12° C. or less. Additionally, if the temperature is −40° C. or less, the shelf life can be from 2 years to 4 years, and in some cases longer. These shelf lives, even at above −40° C., are far longer than refrigerated fresh cream, which typically has a shelf life of less than 6 weeks. Since the neat-cream beads maintain a free-flowing state, they can be easily portioned out for smaller packaging options and stored in conventional home freezers, retaining the properties of fresh cream. The free-flowing state also allows for easier distribution, apportionment and use for those in the food industry, and may be more easily stored in smaller portions for use in pre-packaged frozen meals or restaurants.

When the neat-cream beads are needed for use at the use site, they can be thawed back into a liquid and used the same as fresh cream. However, in most cases, thawing is not necessary. In one embodiment, the neat-cream beads are measured to obtain an appropriate amount for a specific use and blended into the recipe in the frozen neat-cream bead state.

In addition to the above uses, the neat-cream beads can be dehydrated to form beads of anhydrous milk fat that can be stored above freezing temperatures. Conventional anhydrous milk fat is made by driving the moisture off the cream with heat. Gravity and centrifugation have also been used to make the cream anhydrous. The anhydrous milk fat, as used herein, can include butteroil and anhydrous milk fat; that is, it is at least 99.3% milkfat and can be made from cream of different ages. However, preferred is anhydrous milk fat that is at least 99.8% milk fat and made from fresh cream (preferably neat-cream, as discussed above, and preferably having no additives). More preferred is anhydrous milk fat that is at least 99.9% milk fat.

In one embodiment of this disclosure, anhydrous milk fat is produced by first freezing neat cream into small beads, as described above. The frozen beads are then dehydrated by pulling a vacuum in a cold chamber. Generally, the cold chamber is a temperature of less than −40° C. and more typically at or less than −45° C. Thus, the frozen beads undergo freeze-drying with the water in the beads being drawn off by the vacuum. Generally, the vacuum can be less than 0.1 atm (less than about 100,000 microbar), more typically less than 0.05 atm (less than about 50,000 microbar). Often the vacuum will be in the range of 50-25,000 microbar. The resulting dehydrated milk fat in bead form can then be packaged in various packaging options, including vacuum packaging, and stored or shipped. While the resulting anhydrous milk-fat beads can be stored at a temperature of less than up to about 4° C., doing so will compromise the advantages of having a free-flowing frozen bead product. Accordingly, the resulting anhydrous milk-fat will generally be kept at temperatures of less than −12° C., or less than −18° C., for storage and shipping so that the frozen beads remaining in a free-flowing state with similar advantages as outlined above for neat-cream frozen beads, including both packaging advantages and shelf life advantages.

Therefore, the present invention is well-adapted to attain the ends and advantages mentioned as well as those that are inherent therein. The particular embodiments disclosed herein are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Additionally, where the term "about" is used in relation to a range, it generally means plus or minus half the last significant figure of the range value, unless context indicates another definition of "about" applies.

Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A particulate frozen dairy product comprising:
    beads which remain free-flowing when at a temperature of about −12° C. or less, wherein said beads have a diameter of from about 1 mm to about 15 mm, and wherein said beads consist essentially of either frozen neat cream or frozen anhydrous milk fat, wherein said frozen neat cream and said anhydrous milk fat are each produced from neat cream, and said neat cream comprises dairy cream essentially free of any non-dairy food ingredients other than thickening agents or stabilizers such that the neat cream comprise from 0.0 wt % to 2.0 wt % said thickening agents and said stabilizers, and less than 0.1 wt % of said non-dairy food ingredients other than the thickening agents and the stabilizers, and
    wherein said dairy cream has a fat content of from 18 wt % to 50 wt %.

2. The particulate frozen dairy product of claim 1, wherein said beads have a diameter from about 1.5 mm to about 10 mm.

3. The particulate frozen dairy product of claim 1, wherein said beads have a diameter from about 1 mm to about 5 mm.

4. The particulate frozen dairy product of claim 1, wherein said beads remain free flowing when at a temperature of −18° C. or less.

5. The particulate frozen dairy product of claim 4, wherein said beads consist essentially of said neat cream having at least 99.9 wt % dairy cream having a fat content of from 20 wt % to 42 wt %.

6. The particulate frozen dairy product of claim 4, wherein said beads consist essentially of said anhydrous milk fat.

7. The particulate frozen dairy product of claim 4, wherein said neat cream comprises at least 99.5 wt % dairy cream having a fat content of from 20 wt % to 42 wt %, and comprises from 0.1 wt % to 0.5 wt % the thickening agents and the stabilizers, less than 0.01 wt % of non-dairy-cream food ingredients other than the thickening agents and the stabilizers.

\* \* \* \* \*